(12) United States Patent
Ma et al.

(10) Patent No.: US 10,797,436 B2
(45) Date of Patent: Oct. 6, 2020

(54) ELECTRICAL CONNECTOR STRUCTURE ADAPTED FOR A CIGARETTE LIGHTING DEVICE IN VEHICLES

(71) Applicant: Yaowu Ma, Stevenson Ranch, CA (US)

(72) Inventors: Yaowu Ma, Stevenson Ranch, CA (US); Fen Ruan, Stevenson Ranch, CA (US); Jun Ma, Zhengzhou (CN); Pinzhen Huang, Zhengzhou (CN); Qianjing Ma, Zhengzhou (CN); Qianjia Ma, Zhengzhou (CN); George Ma, Zhengzhou (CN); Hongmei Ma, Zhengzhou (CN); Xuemei Ma, Zhengzhou (CN)

( * ) Notice: Subject to any disclaimer, the term of this patent is extended or adjusted under 35 U.S.C. 154(b) by 50 days.

(21) Appl. No.: 16/037,987

(22) Filed: Jul. 17, 2018

(65) Prior Publication Data

US 2018/0323537 A1 Nov. 8, 2018

Related U.S. Application Data

(63) Continuation of application No. PCT/CN2017/071396, filed on Jan. 17, 2017.

(30) Foreign Application Priority Data

Jan. 22, 2016 (CN) .......................... 2016 1 0039962

(51) Int. Cl.
*H01R 13/622* (2006.01)
*B60K 35/00* (2006.01)
(Continued)

(52) U.S. Cl.
CPC ........... *H01R 13/622* (2013.01); *B60K 35/00* (2013.01); *B60K 37/00* (2013.01); *B60N 3/14* (2013.01);
(Continued)

(58) Field of Classification Search
CPC ...... H01R 13/622; H01R 13/52; H01R 29/00; B60D 1/64
(Continued)

(56) References Cited

U.S. PATENT DOCUMENTS 1,732,784 A * 10/1929 Wolfson .................... F23Q 7/00
   219/266
3,994,553 A * 11/1976 Kornick ................. H01R 13/53
   439/281
(Continued)

FOREIGN PATENT DOCUMENTS

CN      2366986 Y      3/2000
CN      203103640   *  7/2013    ............. H01R 13/52
(Continued)

OTHER PUBLICATIONS

International Search Report and Written Opinion dated Jul. 27, 2017 in PCT/CN2017/071396.
1st Office Action dated Feb. 11, 2019 in CN 201610039962.7.

*Primary Examiner* — Peter G Leigh
(74) *Attorney, Agent, or Firm* — Syncoda LLC; Feng Ma

(57) ABSTRACT

A secure electrical connector set compatible with a conventional vehicle cigarette lighter includes: a female connector having an external thread for at an inlet outer diameter of the female connector; and a male connector having a flange and an internally threaded locking cap; wherein the male connector is configured to be inserted into the female connector such that: the flange of the plug contacts an inlet end of the female connector; the internal thread of the locking cap is screwed onto the external thread of the female connector; and the male and female connectors are securely coupled mechanically while achieving an electrical connection therebetween.

20 Claims, 13 Drawing Sheets

(51) Int. Cl.
  *B60K 37/00* (2006.01)
  *B60N 3/14* (2006.01)
  *H01R 24/86* (2011.01)

(52) U.S. Cl.
  CPC .... *B60K 2370/81* (2019.05); *B60K 2370/816* (2019.05); *B60K 2370/834* (2019.05); *H01R 24/86* (2013.01); *H01R 2201/26* (2013.01)

(58) Field of Classification Search
  USPC .......................... 439/306, 668, 320, 551, 552
  See application file for complete search history.

(56) References Cited

U.S. PATENT DOCUMENTS

| | | | | |
|---|---|---|---|---|
| 4,248,494 A * | 2/1981 | McDonald | ............ | H01R 31/02 439/638 |
| 4,421,369 A * | 12/1983 | Myking | ................ | H01R 24/20 439/135 |
| 4,622,454 A * | 11/1986 | Castille | .................... | B60N 3/14 16/433 |
| 5,006,078 A * | 4/1991 | Crandall | ............ | H01R 13/5213 439/521 |
| 5,217,395 A * | 6/1993 | Bailey | .................... | H01R 27/00 439/620.21 |
| 5,230,641 A * | 7/1993 | Wharton | ............ | H01R 13/2421 439/668 |
| 5,304,073 A * | 4/1994 | Golobay | ............... | E21B 17/028 439/282 |
| 5,569,053 A * | 10/1996 | Nelson | .................... | B60N 3/14 439/638 |
| 5,766,020 A * | 6/1998 | Hughes | .................... | B60D 1/64 439/35 |
| 5,860,824 A * | 1/1999 | Fan | .................... | B60R 11/0217 439/165 |
| 5,993,262 A * | 11/1999 | Kowdynski | ............ | H01R 31/06 439/35 |
| 6,179,654 B1 * | 1/2001 | Witkowski | ................ | B60L 1/06 439/550 |
| 6,312,284 B1 * | 11/2001 | Tsay | ........................ | B60N 3/14 439/529 |
| 6,413,101 B2 * | 7/2002 | Divoll | .................. | H01R 31/065 439/35 |
| 6,480,378 B2 * | 11/2002 | Chang | .................... | B60R 11/02 361/679.41 |
| 6,612,875 B1 * | 9/2003 | Liao | ................... | H01R 13/2421 439/638 |
| 6,648,520 B2 * | 11/2003 | McDonald | ........... | G02B 6/3869 385/59 |
| 6,682,356 B2 * | 1/2004 | Erez | .................... | H01R 13/4538 439/108 |
| 6,695,648 B2 * | 2/2004 | Liao | ....................... | H01R 24/58 439/668 |
| 6,855,003 B1 * | 2/2005 | Wyant | ............... | H01R 13/2421 439/108 |
| 6,902,437 B1 * | 6/2005 | Wang | .................. | H01R 31/065 439/265 |
| 7,165,987 B2 * | 1/2007 | Kim | .................... | H01R 13/5219 439/271 |
| 7,481,584 B2 * | 1/2009 | Cairns | .................. | H01R 13/523 385/60 |
| 7,611,388 B1 * | 11/2009 | Lee | ........................ | H01R 13/62 439/668 |
| 7,972,176 B2 * | 7/2011 | Burris | ................. | H01R 9/0521 439/584 |
| 8,547,056 B2 * | 10/2013 | Chang | .................. | H02J 7/0042 320/107 |
| 9,048,573 B2 * | 6/2015 | Grzegorzewska | ... | H01R 13/508 |
| 9,130,305 B2 * | 9/2015 | Ramos | ............... | H01R 13/5221 |
| 2002/0022392 A1 * | 2/2002 | Below | .................... | H01R 24/64 439/271 |
| 2005/0153591 A1 * | 7/2005 | Milner | ............... | H01R 13/5213 439/321 |
| 2007/0036489 A1 * | 2/2007 | Grzegorzewska | ... | H01R 13/508 385/88 |
| 2009/0163058 A1 * | 6/2009 | Craig | .................. | H01R 13/447 439/147 |
| 2015/0207533 A1 * | 7/2015 | Ferraro | ............. | H01R 13/5213 455/558 |
| 2015/0222049 A1 * | 8/2015 | Armacost | ................ | B60D 1/64 439/312 |
| 2017/0288335 A1 * | 10/2017 | Hsu | ....................... | G02B 6/3816 |

FOREIGN PATENT DOCUMENTS

| CN | 203103640 U | 7/2013 |
|---|---|---|
| CN | 203277815 U | 11/2013 |
| CN | 104348023 A | 2/2015 |

\* cited by examiner

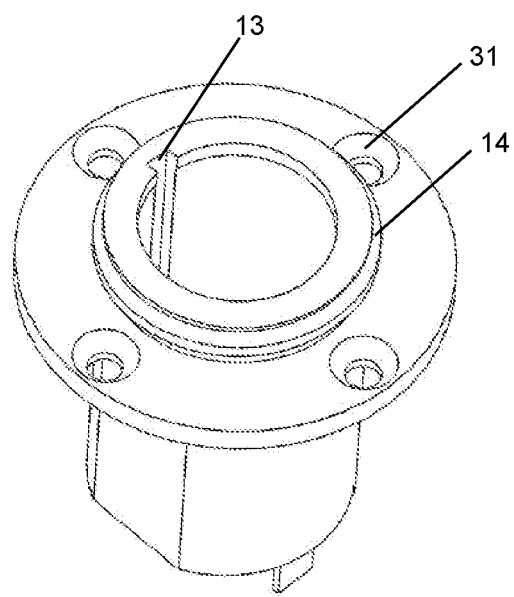
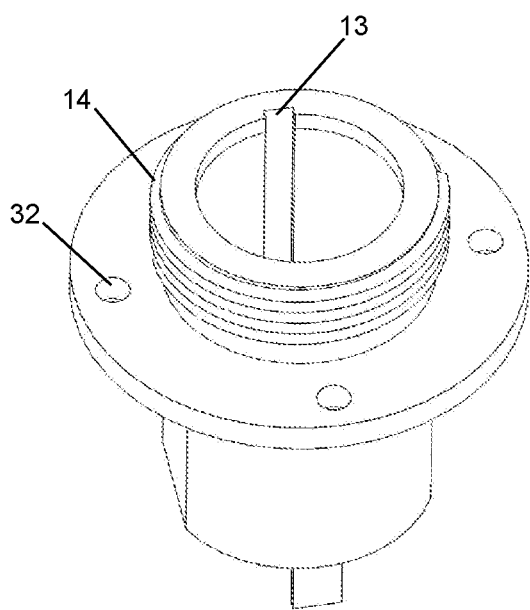
FIG. 11          FIG. 12
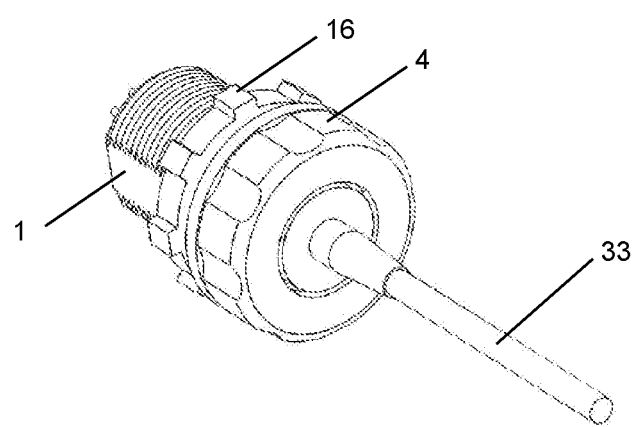
FIG. 13

ELECTRICAL CONNECTOR STRUCTURE ADAPTED FOR A CIGARETTE LIGHTING DEVICE IN VEHICLES

CROSS-REFERENCE TO RELATED APPLICATIONS

The present application is a continuation of PCT/CN2017/071396 filed on Jan. 17, 2017, which claims priority to Chinese Patent Application No. 201610039962.7 filed on Jan. 22, 2016. The disclosures of the above applications are hereby incorporated by reference in their entirety.

BACKGROUND

Many automobiles are equipped with a cigarette lighter socket at the dashboard to facilitate the driver's easy insertion and easy removal of a cigarette lighter. The cigarette lighter socket is not only used for the cigarette lighter, but also can be used for supplying electricity, that is, as a power socket for a variety of electronic devices. For convenience, cigarette lighter sockets are often installed in multiple locations inside a car, for example adjacent to the front and rear seats. In modern days, drivers and passengers smoke less, and some cigarette lighter sockets are solely used as power outlets for electronic devices such as mobile phones. Typically, a low-cost cigarette lighter socket is only used as a power supply for electronic devices, and is not resistant to high temperatures and therefore cannot be used for a traditional cigarette lighter. However, its diameter is kept the same as that of a conventional high-temperature cigarette lighter.

The car cigarette lighter socket has been used for a cigarette lighter since 1920's, and later also used as a universal power socket. In the past 90 years, numerous car-powered electric appliances have been invented, and thus the car cigarette lighter sockets are difficult to be eliminated in the future. Conventional automobile cigarette lighter sockets and plugs for power taking have various product types and designs. United States, China, Europe, Japan, South Korea and other countries have many patents in this area, some of which are listed here, US patents: U.S. Pat. Nos. 1,728,049, 2,528,500, 4,622,454, 5,158,484, 8,446,125, 9,112,315B2, U.S. D721,038. Chinese patents: CN01124010, CN2891347Y, CN202917782U, CN203871562U, CN200310100090, CN200710169553, CN200810067659, CN200810096360, CN201280045584. European Patent: EP2198526B1, EP2233353B1. Japanese patents: JPA_1993226037, JPA_1997283231, JPA_1998326648, JPA_2000030814, JPU_1993079882. Korean Patent: 1020080119295.

National standards vary from country to country. For example, a 12V car cigarette lighter socket and plug have the size A and a socket inner diameter of 20.93-21.01 mm, which is mainly used in the U.S. market. The size B, socket diameter 21.13-21.33 mm, mainly used in European markets.

SUMMARY

The inventors of the present disclosure have recognized that, as a power socket, a conventional car cigarette lighter socket and plug have poor retention of the socket and plug, the plug may become loose due to the vibration of the car under normal driving condition of the vehicle and may be out of electrical contact with the socket. In addition, the gap between the socket and the plug is relatively large. When the plug is inserted into the socket, the mechanical mounting force is quite weak, unstable, and the vibration of the normal driving of the vehicle makes the plug greatly shaking. Considering the cigarette lighter function, power supply function, various countries' different standards, and interchangeability with previous products, the problems of the loosening of the conventional plug and particularly unreliable electrical contact have not been well solved.

However, satellite navigators, cell phones, and small computers have been widely used in recent years, and opportunities for use in automobiles have been greatly increased. If the present cigarette lighter socket and plug were to directly hold a satellite navigator, cell phone, or a small computer, because these electrical devices weigh much more than wires, their displays may be shaky when the car is moving, and may be difficult to view, difficult to touch, and can easily fall off and lose power connection with the socket. Therefore, holders of satellite navigators, cell phones, small computers, etc. are typically designed to be separated from the cigarette lighter socket and plug. A universal holder can still have poor mechanical connection, and the connected wires are not tidy. Because the car inside space is limited, untidy wires can hinder driver and passengers' actions inside the car.

Some cars have Universal Serial Bus (USB) sockets and/or Secure Digital (SD) memory card sockets installed. At the rear of some cars, there are trailers with 4 electrodes or more connected to the power supply for powering trailer brakes, taillights, brake lights, and turn signals, etc. These sockets and their mating plugs can be connected to wires and the like, but because of poor mechanical retaining, it is difficult to directly hold external electronic devices and the waterproof performance is also poor.

The present disclosure relates to electrical sockets and plugs for vehicles, trains, motorcycles, ships, aircraft and other vehicles and daily life. In order to solve the deficiencies in the prior art, various embodiments of the present disclosure provide an electrical socket and plug that have good mechanical support, good waterproof performance, tidy wiring, and good interchangeability with previous products. The anti-loosening electrical socket and plug according to various embodiments of the present disclosure have good versatility and can generate a large number of new usage scenarios.

In order to solve the abovementioned technical problems in existing technologies, various embodiments of the present disclosure include an external thread on the car cigarette lighter socket, and a flange and an internal thread locking cap in the car cigarette lighter plug, such that the plug can be tightened with the locking cap to the socket to achieve mechanical retaining without loosening, and good electrical connection at same time.

In an aspect, a secure such as an anti-loosening electrical socket and plug are provided. In some embodiments, the socket has an electrode of a car cigarette lighter socket and also has an external thread at its inlet outer diameter. In some embodiments, the plug has an electrode of a car cigarette lighter plug and also has a flange and internally threaded locking cap.

The plug can be inserted into the socket such that the flange of the plug contacts the inlet end of the socket, and the internal thread of the locking cap is screwed onto the external thread of the socket, such that the socket and plug are mechanically coupled together securely while simultaneously achieving electrode contact. In some embodiments, the plug can be inserted into a regular car cigarette lighter socket without external thread to achieve electrode contact.

In some other embodiments, a conventional car cigarette lighter plug without a flange or internally threaded locking cap can be inserted into the socket of various embodiments of the present disclosure to achieve electrode contact.

In some embodiments, the socket has a guide slot. In some embodiments, alternatively, the plug has a guide spring or a guide key.

In some embodiments, the socket or the plug has additional electrodes in addition to the positive and negative electrodes of an existing conventional car cigarette lighter socket or plug.

In some embodiments, the additional electrodes on the socket are elastic metal pins, elastic metal plates, and elastic metal wires arranged on the bottom or side surface of the socket. In some other embodiments, the additional electrodes on the plug are inelastic or elastic electrodes.

In some embodiments, the additional electrode is the electrode of a USB or HDMI connector.

In some embodiments, a rubber ring is disposed between the port of the socket and the flange of the plug, and the socket and the plug are pressed against the rubber ring, so as to improve sealing or achieve waterproof performance.

In some embodiments, the socket is mounted on a front panel of a dashboard of a car, an upper panel of a dashboard of a car, a seat back of a car, a ceiling of a front of a car, a ceiling of a central portion of a car, or on a motorcycle, a train, or an airplane.

In some embodiments, the plug is an integral component formed with the holder of one or more of Global Positioning System (GPS) satellite navigators, cell phones, televisions, monitors, cameras, radars/radar detectors, lighting panels, searchlights, toys, lightings, fragrance devices, detectors, electrical sockets, electrical plugs, socket extension converters, USB sockets, High-Definition Multimedia Interface (HDMI) sockets, electric cups, fans, wireless chargers, wireless communicators, coat hooks, etc.

In some embodiments, the car cigarette lighter socket and plug are replaced by the socket and plug of USB, HDMI, flat-type or round-type pin electrodes.

In some embodiments, the car cigarette lighter socket and plug are replaced by the socket and plug of a wall alternate current (AC) power supply, an AC power terminal block, an AC power supply for an electrical device, or an AC power line sockets and plugs.

In some embodiments, the plug has no electrode, with or without a flange or an internal thread, by screwing or inlaying on an external thread of the socket, to form a socket protection cap or mechanical holder.

As such, the anti-loosening electrical socket and plug according to some embodiments add an external thread on the existing car cigarette lighter socket, adds a flange and an internal threaded locking cap to the existing car cigarette lighter plug, so that the invented plug can be tightened with the locking cap to the invented socket to achieve mechanical mounting without loosening and electrical connection at same time.

Between the socket port and the plug flange, a sealing rubber ring is placed and squeezed to achieve waterproof. By increasing the number of electrodes and guide springs, multiple electrodes are connected and the wiring is tidy.

The anti-loosening electrical socket and plug according to some embodiments can be mutually inserted to the existing car cigarette lighter plug and socket with full compatibility to achieve the existing normal electrical connection.

The anti-loosening electrical socket and plug according to some embodiments can also be applied to USB, trailers, building wall AC power socket and plug and the like. The anti-loosening electrical socket and plug according to some embodiments can generate a large number of new use scenarios, can simultaneously mechanically mount and electrically connect a satellite navigator, a mobile phone, a display, a camera, a detector, etc., and can be widely applied to vehicles and daily life.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

FIG. 11 is a perspective view of an anti-loosening electrical socket according to some embodiments, having screw holes configured to mount from the front.

FIG. 12 is a perspective view of an anti-loosening electrical socket according to some embodiments, having screw holes configured to mount from the rear.

FIG. 13 is a perspective view of an assembled anti-loosening electrical socket and plug according to some embodiments.

DETAILED DESCRIPTION

In the following, with reference to the drawings of various embodiments disclosed herein, the technical solutions of the embodiments of the disclosure will be described in a clear and fully understandable way. It is noted that the described embodiments are merely some but not all of the embodiments of the disclosure. Based on the described embodiments of the disclosure, and that those ordinarily skilled in the art can obtain other embodiment(s), which come(s) within the scope sought for protection by the disclosure.

Figure 1:
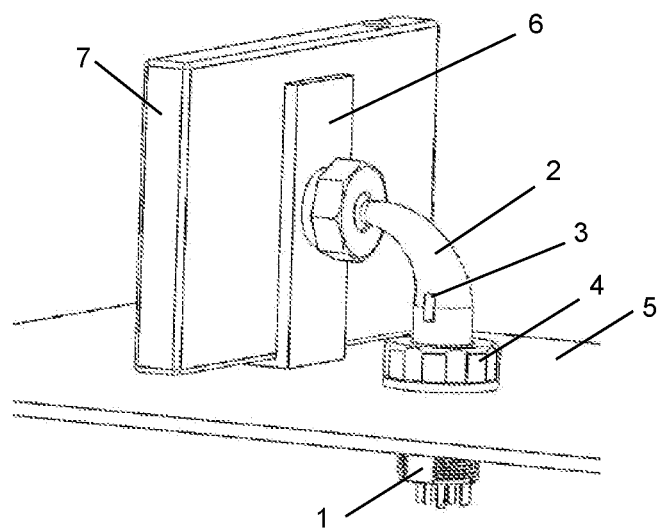
FIG. 1 illustrates a rear perspective view of a GPS navigation device mounted on the dashboard of a car with a secure electrical socket and plug according to some embodiments.

FIG. 1 illustrates a rear perspective view of a GPS navigation device mounted on the dashboard of a car with a secure electrical socket and plug according to some embodiments. The secure electrical socket and plug have anti-loosening function according to various embodiments disclosed herein, as described in more detail below. In addition, it is noted that although the device, components, and sets or kits disclosed herein are described with reference to a "socket" and a "plug," those of ordinary skill in the art will recognize that these components can also be referred to respectively as a "female connector" and a "male connector."

In various embodiments of the present disclosure, the "socket" and "plug" or the "female connector" and the "male connector" provide both electrical coupling and mechanical coupling, and are referred to as "electrical socket" and "electrical plug," or "electrical female connector" and "electrical male connector." However, in some embodiments, these devices provide only mechanical coupling without electrical coupling.

Figure 2:
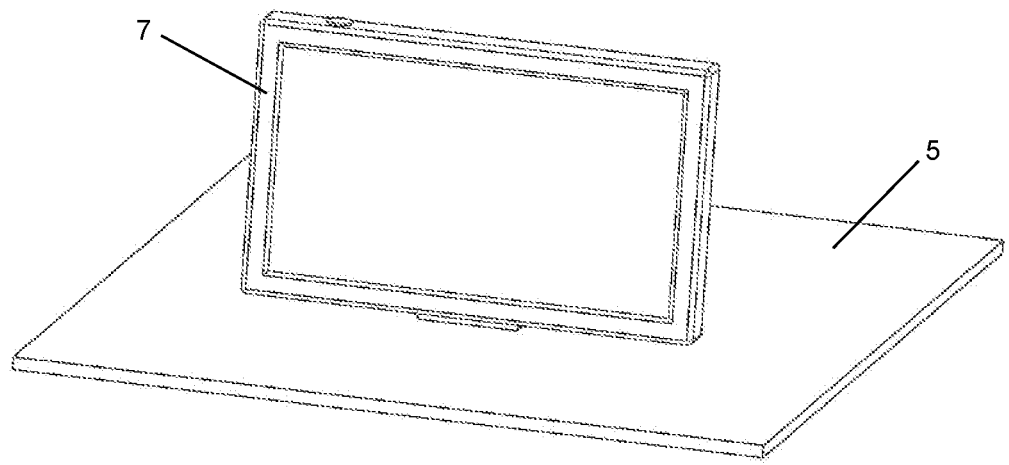
FIG. 2 is a front perspective view of the GPS navigation device and socket/plug of FIG. 1.

FIG. 2 is a front perspective view of the GPS navigation device and socket/plug of FIG. 1.

As shown FIGS. 1 and 2, an anti-loosening electrical socket 1 is coupled to an anti-loosening electrical plug 2. The plug 2 as shown has a USB interface socket 3. The socket 1 has a threaded locking cap 4. The coupled socket 1 and plug 2 form a set or kit disposed over an upper panel 5 of the dashboard of an automobile. The socket 1 and plug 2 are further coupled to a device holder 6, such as a global positioning system (GPS) navigation device holder, which is configured to hold the GPS navigation device 7. The dashboard of the car is in front of the driver of the car, for example. The driver of the car view the automobile instruments as well as the display of the device 7, can operate them by hand.

Figure 3:
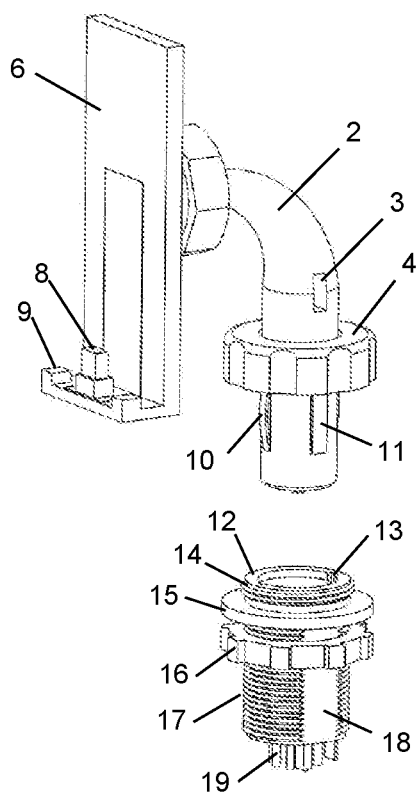
FIG. 3 is an exploded view of the socket and plug of FIG. 1 without the GPS navigation device and the dashboard.

FIG. 3 is an exploded view of the socket and plug kit of FIG. 1 without the GPS navigation device or the dashboard. A USB connector 8 is shown on the GPS device holder 6 and can supply power and electrical connection to the GPS navigation device. A protrusion 9 may be provided for mechanically mounting the GPS navigation device.

A guide spring 10 can be provided for the plug 2. A spring power electrode 11 can be provided for the plug 2 and be part of the guide spring. The socket 1 can have an end face 12, a guide slot 13 configured to operate with the guide spring piece 10.

The socket 1 can also include an external thread 14 configured to mate with a threaded locking cap 4. The socket 1 can further comprise a socket flange 15, a socket mounting nut 16, a thread 17, a positioning plane 18 for the socket rotation direction, and an external electrode 19.

The dashboard panel 5, which has a hole into which the thread 17 and the positioning plane 18 are fittingly inserted, is clamped by the socket flange 15 and the mounting nut 16 in order to mount the socket.

Conventional automobile cigarette lighter socket and plug typically only provide conduction of the positive and negative electrodes of the power supply. In contrast, various embodiments of the present disclosure provide a variety of connections and electrical paths.

Some embodiments of the present disclosure provide a multi-electrode socket and plug to facility multiple electrical/mechanical connections. For example, in addition to the power connection, the GPS navigation device 7 in FIG. 2 can take advantage of an external on-board antenna in order to obtain better GPS signals and traffic intelligence signals with higher sensitivities. In addition, the GPS navigation device sound and image signals and mobile phone data signals can be transmitted to the system of the vehicle.

Figure 4:
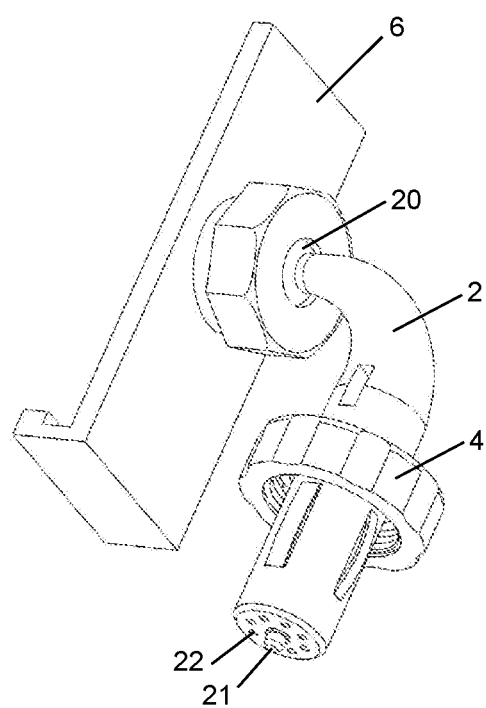
FIG. 4 is a perspective view of the plug of FIG. 3 with the additional plurality of electrodes according to some embodiments.

FIG. 4 illustrates a multi-electrode anti-loosening electrical plug according to some embodiments, including a device holder steering ball 20, such that the GPS navigation device can be rotated in 3D. A spring power electrode 21 and a plurality of additional electrodes 22 are also included. The guide spring 10 of the plug is inserted into the guide slot 13 of the socket to position the plug for rotation, such that the additional electrodes 22 of the plug mate with additional electrodes of the socket.

Figure 5:
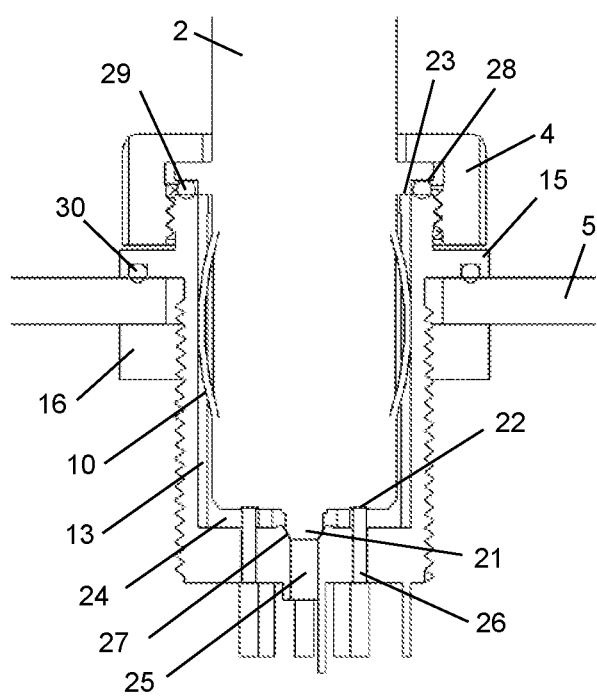
FIG. 5 is a cross-sectional view of the electrical socket and plug assembled together with a sealing rubber ring to realize waterproof performance.

FIG. 5 is a cross-sectional view of the electrical socket and plug assembled together with a sealing rubber ring to achieve waterproof performance.

Figure 6:
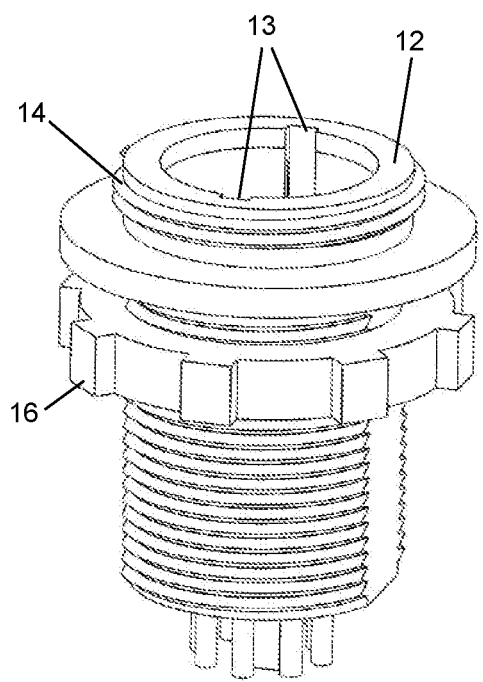
FIG. 6 is a perspective view of a socket for use with the plug of FIG. 4.
Figure 7:
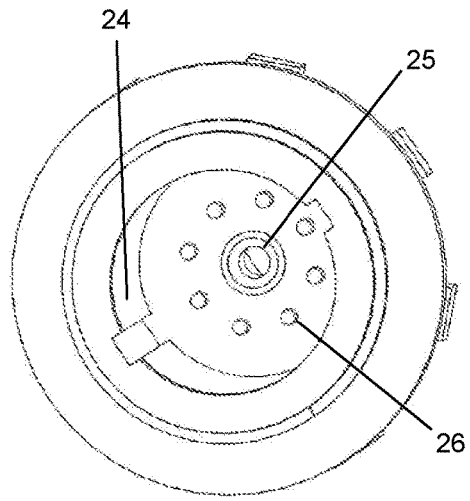
FIG. 7 is a front perspective view of the socket of FIG. 6 showing a plurality of internal electrodes.
Figure 8:
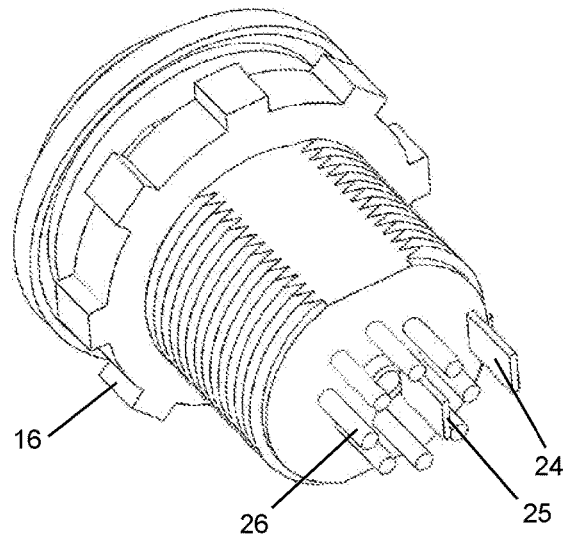
FIG. 8 is a rear perspective view of the socket of FIG. 6.

FIGS. 6, 7 and 8 are three perspectives views of the socket 1. The guide spring 10 of the multi-electrode anti-loosening electrical plug is inserted into the guide slot 13 of the socket. When plugged into the end, a plug flange 23 of the plug is in contact with the end surface 12 of the socket. At the same time, the spring electrode 11 of the plug is in contact with the inner wall electrode 24 of the socket cylinder, the spring electrode 21 of the plug is in contact with the power electrode 25 of the socket, and the additional plurality of electrodes 22 of the plug are in contact with the spring-attached plurality of electrodes 26 of the socket.

At the end faces of the plug electrode 21 and the socket electrode 25, there is a chamfer 27 so that the plug and the socket are kept in the same core. The guide spring tab 10 of the plug mates with the guide slot 13 of the socket so that the plug and the socket are aligned. In this way, the plurality of additional electrodes 22 of the plug mate with the plurality of socket electrodes 26 of the socket, and thus avoid mis-insertions.

As shown, there are two guide springs 10 on the plug, and it is easier to keep the same core and steering in comparison with one guide spring. In order to ensure simultaneous contact, all the plug electrodes 21 and the socket electrodes 26 employ spring electrodes. Spring extension Pogo pin is a good spring electrode. Metal sheets and wires having special shapes such as spirals, U-shapes, etc. can also be made into spring electrodes.

If the plug is only inserted into the socket to let the electrodes be into conduction, there is looseness, poor mechanical retaining, and no waterproof performance. However, then by tightening the threaded locking cap 4, the plug 2 can be tightly mounted, eliminating looseness and obtaining good mechanical coupling.

Further, a sealing rubber ring 29 can be inserted between the flange surface 28 of the plug and the end surface 12 of the socket in advance. When the threaded locking cap 4 is tightened, the sealing rubber ring 29 is pressed to waterproof the plug 2 and the socket 1. Similarly, when the socket locking nut 16 is tightened, the sealing rubber ring 30 is pressed to waterproof the socket 1 and the dashboard panel 5 of the automobile.

Figure 9:
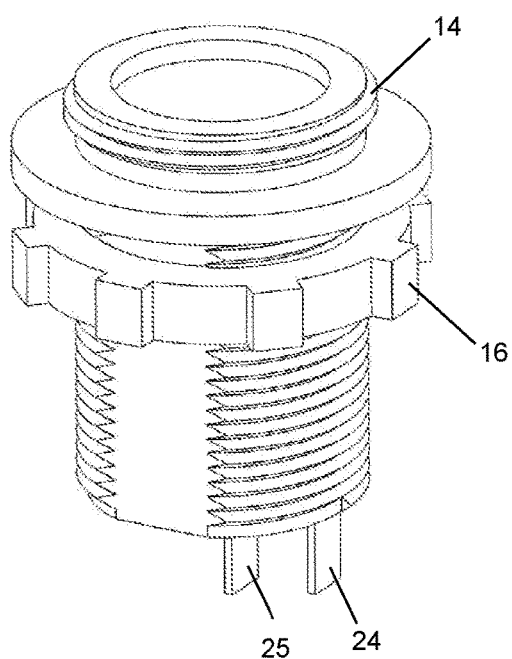
FIG. 9 is a perspective view of an anti-loosening electrical socket of according to some embodiments, with an ordinary car cigarette lighter socket electrode and without a guide slot.
Figure 10:
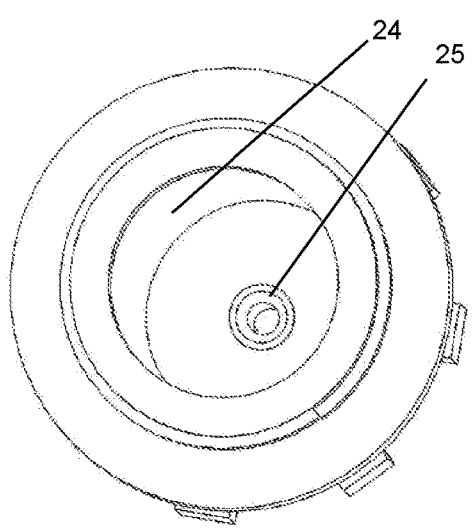
FIG. 10 is a front perspective view of the socket of FIG. 9 showing the internal two electrodes.

In order to reduce cost, it is possible to make an anti-loosening electrical socket and plug without additional electrodes according to some embodiments. FIGS. 9 and 10 are two perspective views of such a socket. As shown, the guide slot of the socket may not be required. The plug without guide key can be plugged into the socket. For a plug with a guide spring, its guide spring can be retracted into the plug cylinder and it can also insert into the socket smoothly.

The anti-loosening electrical socket according to some embodiments may have the same inner diameter, depth and electrodes as a conventional car cigarette lighter socket. Therefore, the ordinary car cigarette lighter plug can be directly inserted into the anti-loosening electrical socket to get electricity. In the same way, the multi-electrode anti-loosening electrical plug here has a plurality of electrodes added to the plug of an ordinary car cigarette lighter, but the external dimensions have not increased. Therefore, the multi-electrode anti-loosening electrical plug can be directly inserted into an existing ordinary car cigarette lighter socket for use.

In this case, the threaded locking cap 4 of the plug can be separated backward by a distance of the thickness of the locking cap 4. Typically, the threaded locking cap 4 of the plug tends not to leave the plug too far away to avoid losing. This can be achieved by enlarging the diameter a little in the vicinity of the plug to define axial slipping of the threaded locking cap 4. Therefore, the anti-loosening electrical socket and plug have a two-way inter insertion ability with the existing ordinary car cigarette lighter socket and plug.

The anti-loosening electrical socket can also be fastened to the panel of a car dashboard using screws. The screw hole 31 of the socket shown in FIG. 11 is suitable for inserting screws from the front of the socket. The screw hole 32 of the socket shown in FIG. 12 is adapted to insert a screw from the rear of the socket. In order to reduce the cost, the number of guide slots 13 of the socket with multiple electrodes are reduced to only one.

Figure 14:
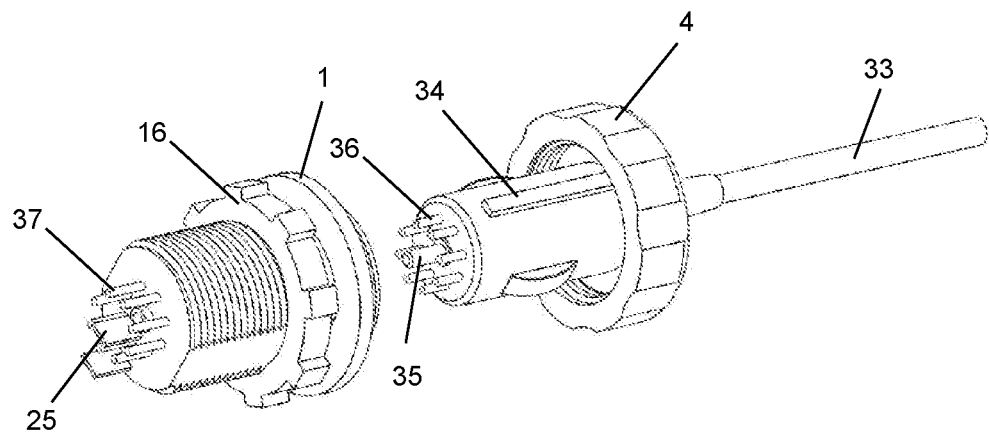
FIG. 14 is an exploded view of the socket and plug FIG. 13 with the additional plurality of electrodes of the plug being pins.

FIG. 13 is a perspective view of an assembled multi-electrode anti-loosening electrical plug inserted into a socket, and FIG. 14 is the exploded view.

The other end of the plug is a wire 33. The plug has a guide key 34 into which a socket with a guide slot can be inserted. A conventional car cigarette lighter plug can be inserted into the socket here. However, because there is no guide slot for an ordinary car cigarette lighter socket, the plug here cannot be inserted. In other words, there is only one-way inter insertion. A plurality of electrodes 35, 36 are included on the plug, which may be spring electrodes or non-spring electrodes. Correspondingly, multiple electrodes 25 and 37 are included on the socket.

Figure 15:
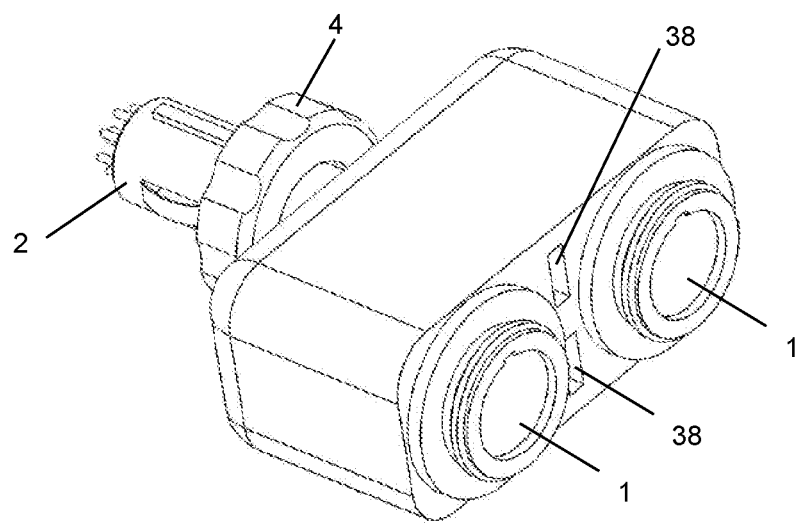
FIG. 15 is a perspective view of a socket extension converter with an anti-loosening electrical socket and plug according to some embodiments.

FIG. 15 is a socket extension converter that converts a multi-electrode anti-loosening electrical socket 1 into two multi-electrode anti-loosening electrical sockets 1 and two USB sockets 38.

Figure 16:
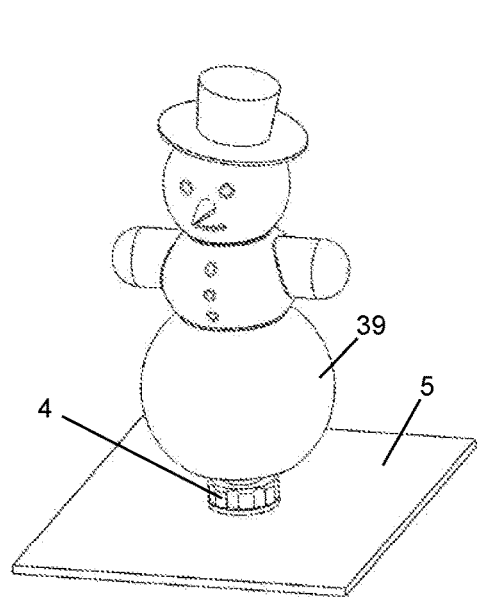
FIG. 16 illustrates a humanoid toy having an anti-loosening electrical plug according to some embodiments.

FIG. 16 is an electrical humanoid toy 39 having an anti-loosening electrical socket and plug. Humanoid toys can also be used without electricity. The socket and plug play the role in mechanical mounting and electrical connection. In a vibrating car, firm mechanical mounting is important.

Figure 17:
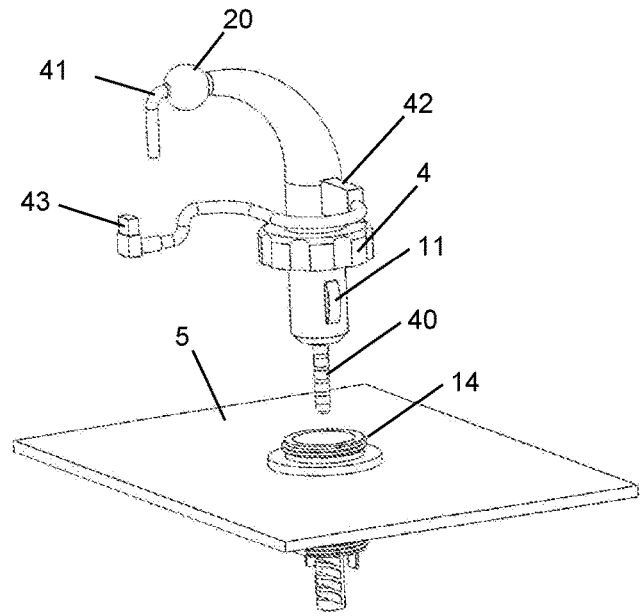
FIG. 17 is an exploded view of an anti-loosening electrical socket and plug according to some embodiments. The plug has a plurality of coaxial electrodes, and is connected with a USB cable, a bracket steering ball, and a wire.

One of the anti-loosening electrical socket and plug shown in FIG. 17 has a plurality of coaxial electrode plug 40. Here guide slot and guide key are not required, and the use is simple. An ordinary car cigarette lighter plug can be inserted into the socket here, but the plug here cannot be inserted into an ordinary car cigarette lighter socket. The plug has a GPS mounting steering ball 20 so that the GPS can rotate in 3D. The wire 41 passes through the steering ball 20 and can be connected to the GPS. There is also a USB socket on the plug, and the USB plug 42 is inserted. The other USB plug end 43 can be inserted into the GPS.

Figure 18:
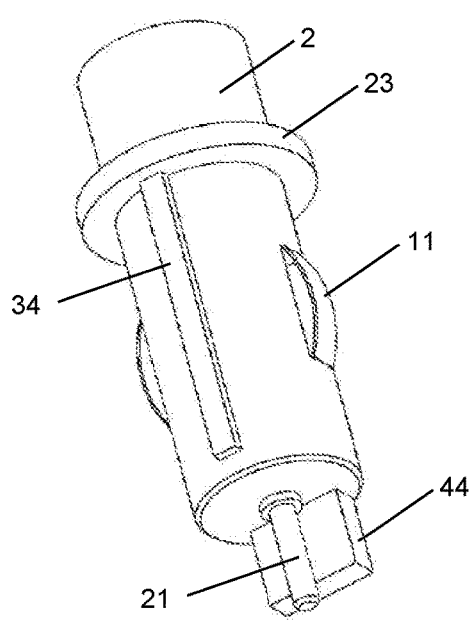
FIG. 18 is a perspective view of an anti-loosening electrical plug according to some embodiments, with additional electrodes being USB plugs.

FIG. 18 is an anti-loosening electrical plug, which has the plug flange 23, a guide key 34, and a USB plug 44 added to an ordinary car cigarette lighter plug.

Figure 19:
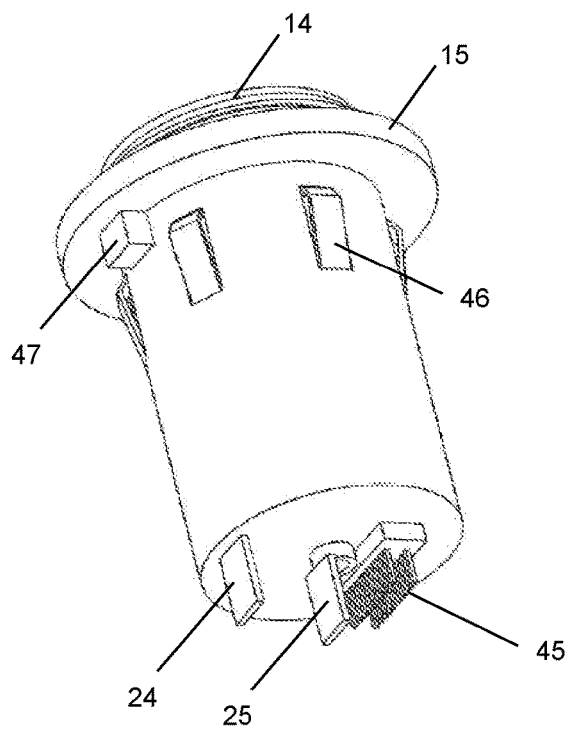
FIG. 19 is a perspective view of a socket configured to mate with the plug of FIG. 18 with mounting pawls.

FIG. 19 illustrates a mating socket, including an electrode 45 of a USB socket, a mounting pawl 46, and an orientation protrusion 47. The mounting pawl 46 has elasticity according to some embodiments. When installed, the rear portion of the socket is inserted into the mounting hole of the dashboard panel of the automobile, and the panel is positioned between the mounting pawl 46 and the socket socket flange 15 by one-touch insertion, and the socket is firmly mounted on the panel. The USB plug 44 can be USB type-A, USB type-B, USB type-C, or HDMI. All of these connectors are widely used now. USB type-A has strong mechanical strength. USB type-C is new and intelligent. USB type-C is flip-able, can do power delivery charging to deliver up to 100 W of power, supports alternate modes, such as Display-Port, Thunderbolt, wired or wireless network connection, etc.

The plug of FIG. 18 has multiple electrodes, anti-loosening and waterproof functions, and a conventional car cigarette lighter plug may also be inserted into the mating socket of FIG. 19.

Due to the presence of the guide key 34 and the USB plug 44, the anti-loosening electrical plug cannot be inserted into an ordinary car cigarette lighter socket. However, if the guide key 34 is replaced with a guide spring 10 or is removed, and the USB plug 44 is manually retracted back to the plug cylinder before insertion, the anti-loosening plug can be inserted into a conventional car cigarette lighter socket for power taking.

Figure 20:
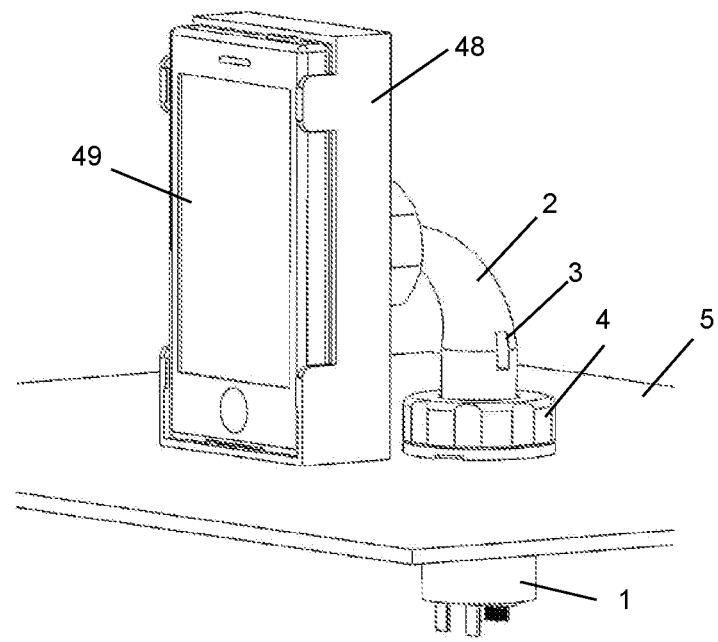
FIG. 20 is a perspective view of an anti-loosening electrical socket and plug according to some embodiments, with a mobile phone mounted on the dashboard of an automobile.

FIG. 20 is an illustration of an anti-loosening electrical socket and plug mounting the mobile phone 49 to the dashboard of the car. The anti-loosening electrical socket and plug provide mechanical mounting and electrical connection of the phone holder 48. The electrical connection between the mobile phone 49 and the mobile phone holder 48 can be connected via a USB connector, iPhone lightning connector, or a wireless short-distance communication connection such as wireless charging and NFC.

Figures 21, 22:
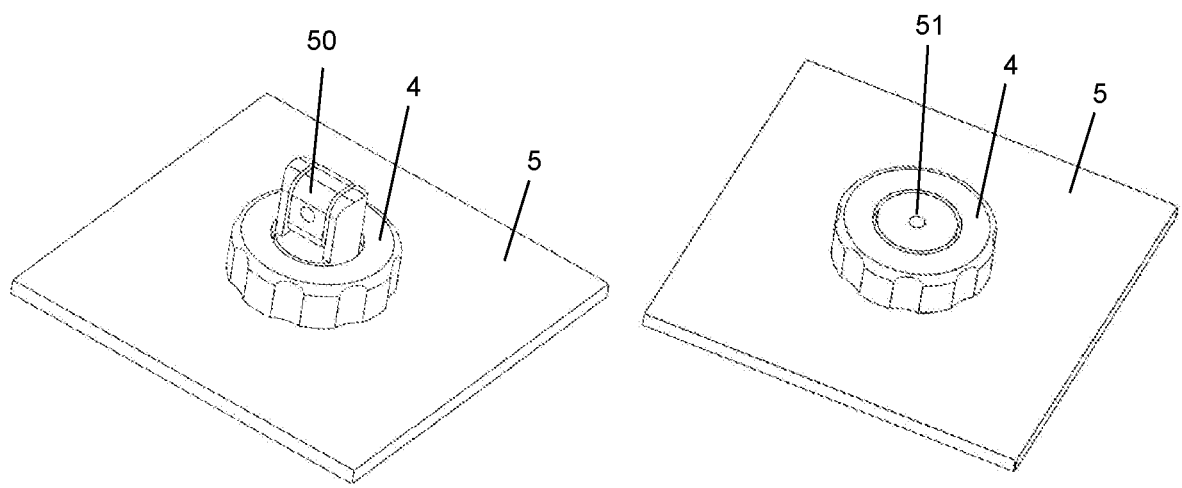
FIG. 21 is a perspective view of an anti-loosening electrical socket and plug according to some embodiments, with a rotatable camera on the plug.
FIG. 22 is a perspective view of an anti-loosening electrical socket and plug according to some embodiments, with a non-rotatable compact camera on the plug.

FIGS. 21 and 22 are perspective views of an anti-loosening electrical socket and plug mounting cameras, respectively. The camera 50 has a camera that can be rotated up and down, left and right, and 51 is a small fixed camera.

Figure 23:
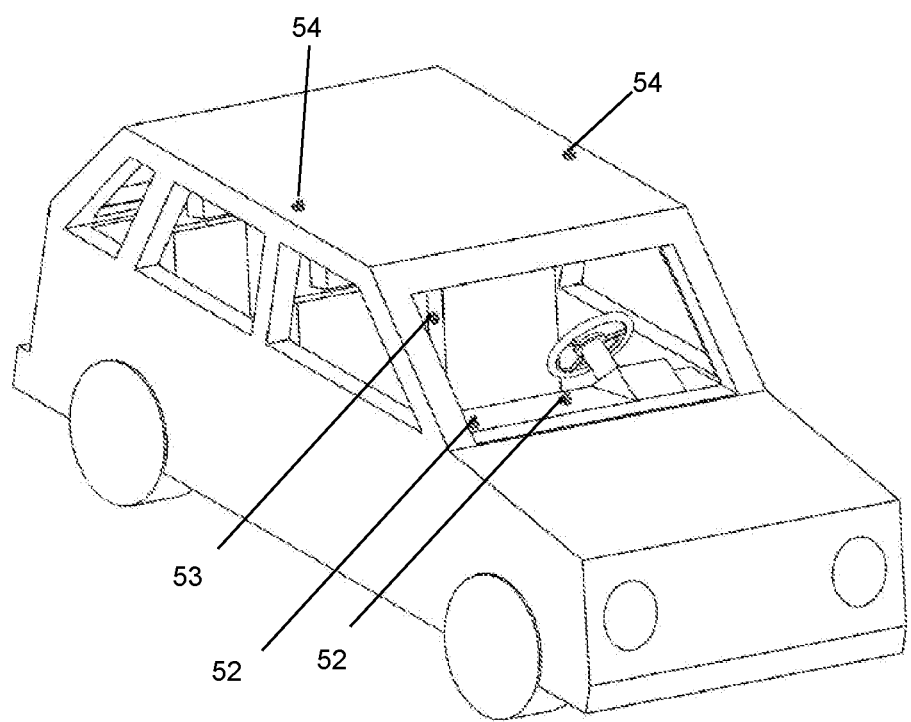
FIG. 23 is a front perspective view of a vehicle having a plurality of anti-loosening electrical sockets mounted thereon, according to some embodiments.
Figure 24:
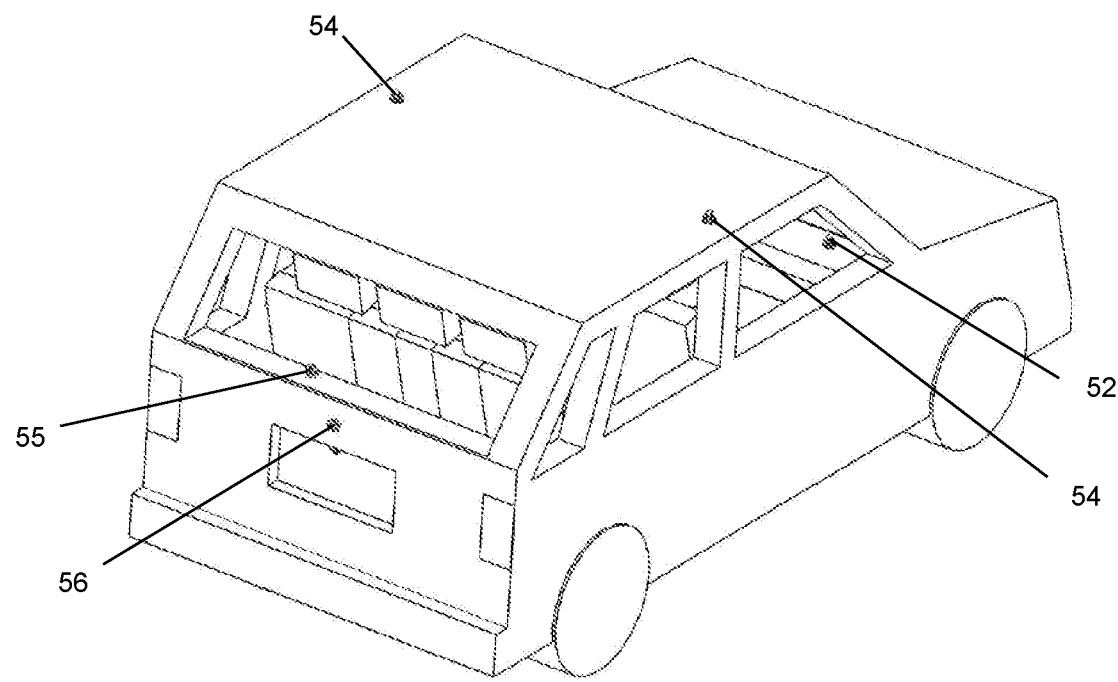
FIG. 24 is a rear perspective view of a vehicle having a plurality of anti-loosening electrical sockets mounted thereon, according to some embodiments.

FIG. 23 is a front perspective view of a vehicle, on which many anti-loosening electrical sockets are mounted. FIG. 24 is a rear perspective view.

The vehicle can have a socket 52 at the car dashboard position, a socket 53 at the car seat position, a socket 54 at the car top exterior, a socket 55 at the car rear window position, a socket 56 at the car back exterior, etc.

The socket can also be installed at the front, middle, and rear inside and outside ceilings of the car, inside the car window, outside the car head, and the car side outside. It can also be mounted on a motorcycle or on a plane.

According to different installation positions and needs, insert the plug into the socket and tighten the locking cap to mechanically mount and electrically connect the GPS satellite navigator, mobile phone, notebook computer, tablet computer, television, monitor, camera, radar, lighting panel, searchlight, toy, light, fragrance, detector, electric cup, fan, wireless charger, wireless near-field communicator NFC, coat hook, etc. It is also possible to mechanically mount and electrically connect various electrical or non-electrical item holders, and then mount various electrical or non-electrical items on the holders.

In most cases, users do not need to insert electrical or non-electrical items to all of the automobile's anti-loose electrical sockets at the same time. In order to be clean and beautiful, it is possible to cover a protective cap with internal thread or no thread. The protective cap may or may not be separated from the sockets.

The above-mentioned anti-loosening electrical socket significantly improves upon an existing car cigarette lighter socket. An existing car cigarette lighter plug can be inserted into an anti-loosening electrical socket for use. This ensures the continuing using ability of numerous existing automotive electrical items. Outside the back of many cars, electrical sockets are installed to provide power to the trailer, in order to brake the trailer, and power the trailer lights, brake lights, and turn signals.

A conventional car cigarette lighter socket and plug do not meet this requirement due to the possibility of loose off and the number of electrodes is not enough. Therefore, different sockets and plugs with flat or round shapes are used now. They do not have the inter insertion ability with ordinary cigarette lighter sockets and plugs. They basically do not have anti-loosening or waterproof function. However, the anti-loosening car cigarette lighter socket and plug according to some embodiments provide the inter insertion ability with an ordinary car cigarette lighter socket and plug, multiple electrodes, prevention of loosening and falling, and waterproof. They can meet the electrical connection to a trailer very well.

Figure 25:
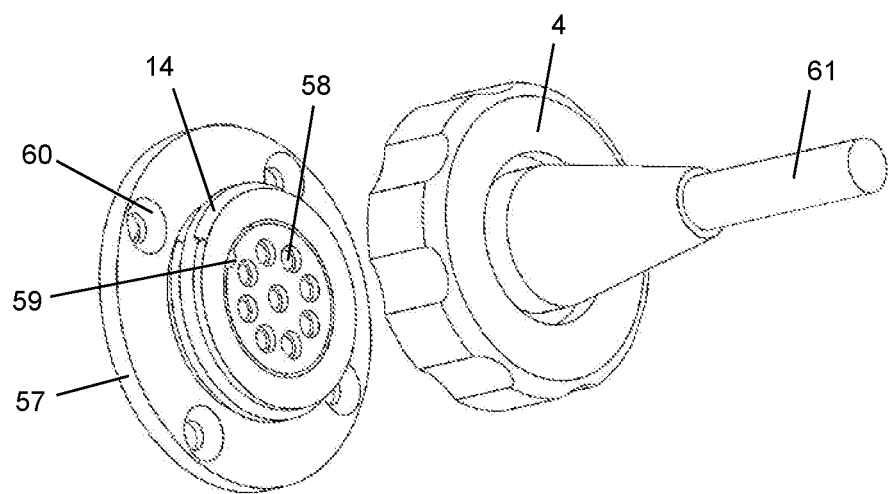
FIG. 25 is a front exploded view of an anti-loosening electrical socket/plug set according to some embodiments, having a plurality of electrodes and guide slots.
Figure 26:
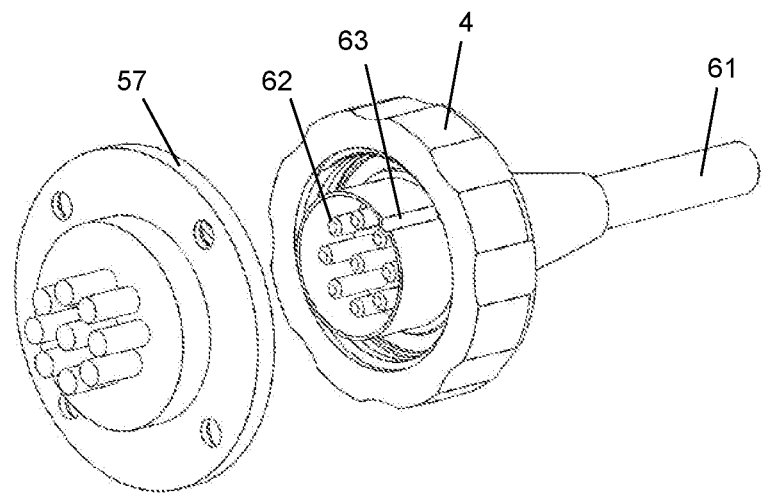
FIG. 26 is a front exploded view of the plug/socket set of FIG. 25.

FIGS. 25 and 26 illustrate a type of anti-loosening electrical socket and plug with different electrodes. In order to reduce the cost, such sockets and plugs have sacrificed the inter insertion ability with the conventional car cigarette lighter sockets and plugs. However, there are multiple electrodes, anti-loosening and waterproof performance. In addition, the diameter of the electrode contact pin is large and it is suitable for a large current connection. For example, 57 is an anti-loosening electrical socket, 58 is the electrode of the socket, 59 is a guide slot, 60 is a socket mounting hole, 61 is a wire of an anti-loosening electrical plug, 62 is a plug electrode contact pin, and 63 is a guide key. The guide key 63 is on the ring, and the ring protects the electrode contact pin 62 to avoid accidental damage.

Figure 27:
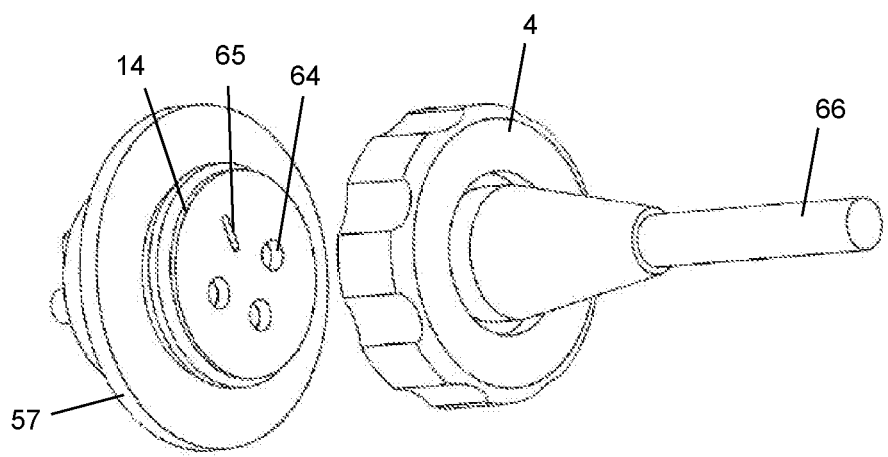
FIG. 27 is a front exploded view of an anti-loosening electrical socket/plug set according to some embodiments having multiple electrodes without guide slots but with non-rotationally insertable electrodes.
Figure 28:
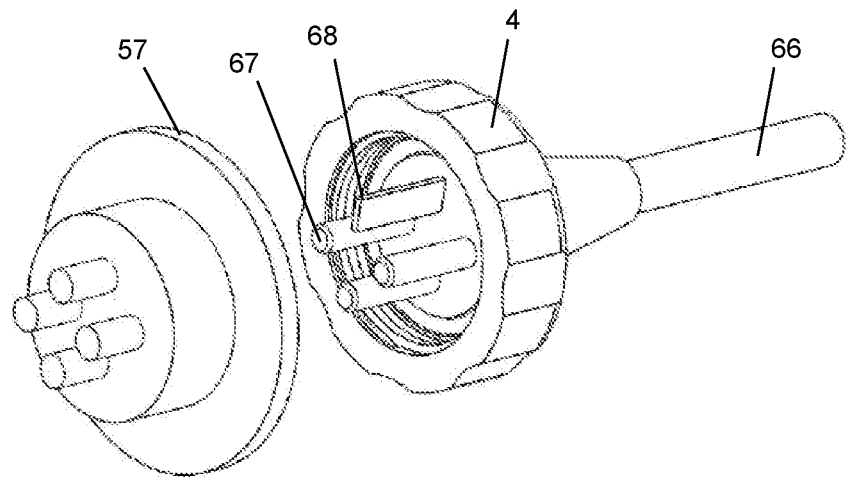
FIG. 28 is a front exploded view of the plug/socket set of FIG. 27.

FIGS. 27 and 28 illustrate a type of anti-loosening electrical socket and plug without the guide slots and guide keys. In order to prevent the electrode pins from being inserted incorrectly, different shapes of electrode pin are used here. For example, 64 is a circular electrode pin insertion hole, 65 is a flat type electrode pin insertion hole, 66 is a wire of an anti-loosening electrical plug, 67 is a circular electrode pin, and 68 is a flat electrode pin.

Figure 29:
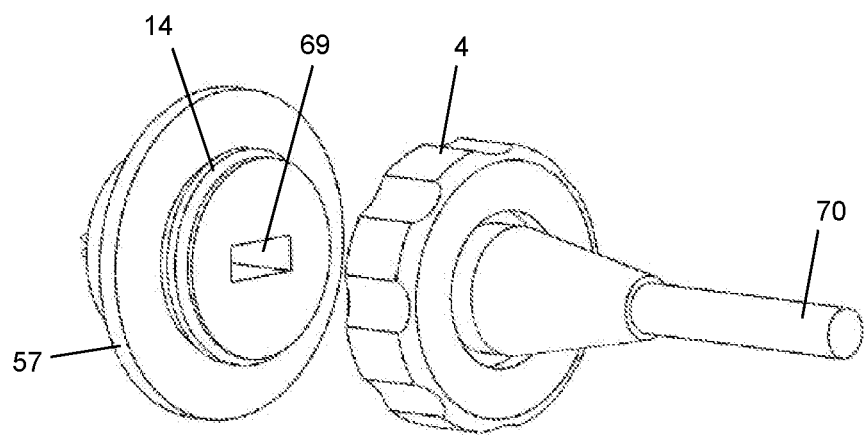
FIG. 29 is a front exploded view of an anti-loosening electrical socket/plug set according to some embodiments with a USB socket.
Figure 30:
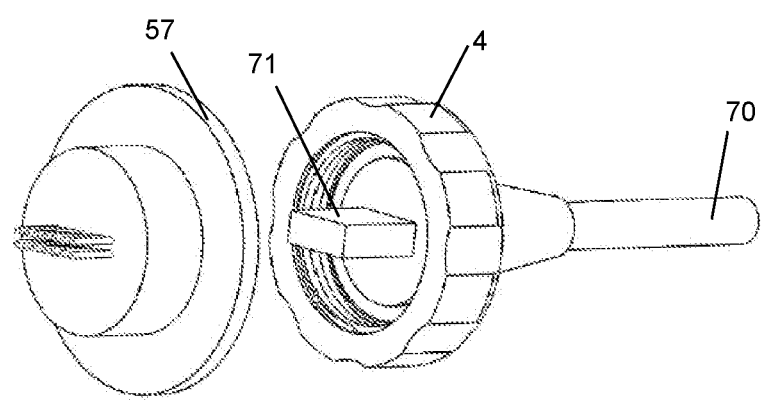
FIG. 30 is a front exploded view of the plug/socket set of FIG. 29.

In some automotive interiors, there are also USB sockets and SD memory card sockets. Such conventional sockets typically do not have waterproof performance. FIGS. 29 and 30 illustrates an anti-loosening USB connector according to some embodiments of the disclosure. For example, 69 is a USB socket, 70 is a wire with an anti-loosening USB plug, and 71 is a USB plug. Here USB connector can be USB-A, micro-USB, USB-C, and can also be replaced with HDMI, SD memory card, micro SD memory card and other existing general electrical connectors.

Similar to the aforementioned anti-loosening car cigarette lighter sockets and plugs, the anti-loosening electrical sockets and the plugs of FIGS. 25 to 30 also have the common features that all of them have a socket port external thread 14, a plug flange, and an internally threaded locking cap 4 to achieve mechanical mounting, electrical connection, and multiple electrodes. They can also have the inter insertion ability with the existing ordinary sockets and plugs. Together with a sealing rubber ring, waterproof can be achieved. Sealing rubber ring can be O-ring rubber ring, X-shaped rubber ring, rubber gaskets, etc.

The anti-loosening electrical socket and plug according to some embodiments can be well used in automobiles, and can also be used in motorcycles, airplanes and buildings. They can be electrical sockets and plugs of car direct current (DC) power supplies, wall AC power supplies, AC power terminal boards, AC power supply for electrical devices, AC power cables, electrical signal connectors, etc.

In the present disclosure, it is to be understood that the terms "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

All references cited in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A secure vehicle cigarette lighter electrical connector assembly compatible with a conventional vehicle cigarette lighter, comprising at least one of:
   an external thread for a female connector at an inlet outer diameter of the female connector; and
   a flange and an internally threaded locking cap for a male connector;
wherein the male connector is configured to be inserted into the female connector such that:
   the flange of the male connector contacts an inlet end of the female connector;
   the internal thread of the locking cap is screwed onto the external thread of the female connector;
   the male and female connectors are securely coupled mechanically while achieving an electrical connection therebetween, while providing both mechanical mounting and electrical connection to a device holder; and
   the male connector has a bent portion configured to orient the device holder toward a vehicle driver.

2. The secure vehicle cigarette lighter electrical connector assembly of claim 1, wherein the female connector is configured to receive a conventional vehicle cigarette lighter plug without the flange or internally threaded locking cap to achieve an electrical connection; or the male connector is configured to be inserted into a conventional vehicle cigarette lighter socket without external thread to achieve an electrical connection.

3. The secure vehicle cigarette lighter electrical connector assembly of claim 2, wherein the female connector has a guide slot, or the male connector has a guide spring or a guide key.

4. The secure vehicle cigarette lighter electrical connector assembly of claim 3, wherein the female connector or the male connector has additional electrodes in addition to positive and negative electrodes compatible with the conventional cigarette lighter socket or plug.

5. The secure vehicle cigarette lighter electrical connector assembly of claim 4, wherein the additional electrodes on the female connector are elastic metal pins, elastic metal plates, or elastic metal wires arranged on a bottom or side surface of the female connector; or the additional electrodes on the male connector are inelastic or elastic electrodes.

6. The secure vehicle cigarette lighter electrical connector assembly of claim 4, wherein the additional electrodes comprise electrodes of a USB or HDMI connector.

7. The secure vehicle cigarette lighter electrical connector assembly of claim 1, further comprising a rubber ring disposed between the outlet of the female connector and the flange of the male connector, wherein the female and male connectors are pressed against the rubber ring, so as to improve sealing or waterproof performance.

8. The secure vehicle cigarette lighter electrical connector assembly of claim 1, wherein:
   the female connector is mounted on one or more of a front panel of an automobile dashboard, an upper panel of a car dashboard, a car seat back, a car front ceiling, a car central part ceiling, a car rear ceiling, a car head exterior, a car rear exterior, a car side exterior, motorcycle, train and aircraft; or
   the male connector is an integral component formed with one or more of a GPS satellite navigation, a mobile phone, a television, a monitor, a camera, lighting panel, search light, toy, light, fragrance, detector, electrical outlet, electric plug, socket expansion converter, USB socket, HDMI socket electric cup, fan, wireless charger, wireless near field communication device, coat hook, and their holders.

9. The secure vehicle cigarette lighter electrical connector assembly of claim 1, wherein the conventional vehicle cigarette lighter socket and plug are replaced by the female connector and plug of USB, HDMI, flat or round type pin electrode.

10. The secure vehicle cigarette lighter electrical connector assembly of claim 1, wherein the conventional vehicle cigarette lighter socket and plug are replaced by the female connector and plug of a wall AC power supply, an AC power terminal block, an AC power supply for an electrical device, and an AC power line.

11. The secure vehicle cigarette lighter electrical connector assembly of claim 1, wherein the male connector has no electrode, with or without a flange or an internal thread, by screwing or inlaying on an external thread of the female connector, to form a socket protection cap or mechanical holder.

12. A secure vehicle cigarette lighter electrical connector assembly compatible with a conventional vehicle cigarette lighter, comprising:
   a female connector having an external thread at an inlet outer diameter of the female connector; and
   a male connector having a flange and an internally threaded locking cap;
wherein the male connector is configured to be inserted into the female connector such that:
   the flange of the male connector contacts an inlet end of the female connector;
   the internal thread of the locking cap is screwed onto the external thread of the female connector; and
   the male and female connectors are securely coupled mechanically while achieving an electrical connection therebetween, while providing both mechanical mounting and electrical connection to a device holder; and
   the male connector has a bent portion configured to orient the device holder toward a vehicle driver.

13. The secure vehicle cigarette lighter electrical connector assembly of claim 12, wherein the female connector is configured to receive a conventional vehicle cigarette lighter plug without the flange or internally threaded locking cap to achieve an electrical connection; or the male connector is configured to be inserted into a conventional vehicle cigarette lighter socket without external thread to achieve an electrical connection.

14. The secure vehicle cigarette lighter electrical connector assembly of claim 13, wherein the female connector has a guide slot, or the male connector has a guide spring or a guide key.

15. The secure vehicle cigarette lighter electrical connector assembly of claim 14, wherein the female connector or the male connector has additional electrodes in addition to positive and negative electrodes compatible with the conventional cigarette lighter socket or plug.

16. The secure vehicle cigarette lighter electrical connector assembly of claim 15, wherein the additional electrodes on the female connector are elastic metal pins, elastic metal plates, or elastic metal wires arranged on a bottom or side surface of the female connector; or the additional electrodes on the male connector are inelastic or elastic electrodes.

17. The secure vehicle cigarette lighter electrical connector assembly of claim 15, wherein the additional electrodes comprise electrodes of a USB or HDMI connector.

18. A vehicle having one or more secure vehicle cigarette lighter electrical connector assemblies compatible with a conventional vehicle cigarette lighter, the set comprising:
   a female connector having an external thread at an inlet outer diameter of the female connector; and
   a male connector having a flange and an internally threaded locking cap;
wherein the male connector is configured to be inserted into the female connector such that:
   the flange of the male connector contacts an inlet end of the female connector;
   the internal thread of the locking cap is screwed onto the external thread of the female connector; and
   the male and female connectors are securely coupled mechanically while achieving an electrical connection therebetween, while providing both mechanical mounting and electrical connection to a device holder; and
   the male connector has a bent portion configured to orient the device holder toward a vehicle driver.

19. The vehicle of claim 18, wherein the female connector is configured to receive a conventional vehicle cigarette lighter plug without the flange or internally threaded locking cap to achieve an electrical connection; or the male connector is configured to be inserted into a conventional vehicle cigarette lighter socket without external thread to achieve an electrical connection.

20. The vehicle of claim 19, wherein:
   the female connector has a guide slot, or the male connector has a guide spring or a guide key;
   the female connector is mounted on one or more of a front panel of an automobile dashboard, an upper panel of a car dashboard, a car seat back, a car front ceiling, a car central part ceiling, a car rear ceiling, a car head exterior, a car rear exterior, a car side exterior, motorcycle, train and aircraft; and
   the male connector is an integral component formed with one or more of a GPS satellite navigation, a mobile phone, a television, a monitor, a camera, lighting panel, search light, toy, light, fragrance, detector, electrical outlet, electric plug, socket expansion converter, USB socket, HDMI socket electric cup, fan, wireless charger, wireless near field communication device, coat hook, and their holders.

* * * * *